United States Patent
Chou et al.

(10) Patent No.: US 9,773,181 B2
(45) Date of Patent: Sep. 26, 2017

(54) INTELLIGENT ENTRANCE GUARD UNLOCKING SYSTEM AND UNLOCKING METHOD THEREOF

(71) Applicant: HON HAI PRECISION INDUSTRY CO., LTD., New Taipei (TW)

(72) Inventors: Wen-Kuei Chou, New Taipei (TW); Hsin-Nan Chen, New Taipei (TW); Chia-Wei Chang, New Taipei (TW); Chih-Chung Weng, New Taipei (TW); Kuang-Yao Liao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 126 days.

(21) Appl. No.: 14/755,867

(22) Filed: Jun. 30, 2015

(65) Prior Publication Data

US 2016/0225208 A1 Aug. 4, 2016

(30) Foreign Application Priority Data

Feb. 4, 2015 (TW) .............................. 104103795 A

(51) Int. Cl.
| | |
|---|---|
| *G05B 19/00* | (2006.01) |
| *G05B 23/00* | (2006.01) |
| *G06F 7/00* | (2006.01) |
| *G06F 7/04* | (2006.01) |
| *G06K 9/00* | (2006.01) |
| *G06T 9/00* | (2006.01) |
| *G06T 7/00* | (2017.01) |

(52) U.S. Cl.
CPC ....... *G06K 9/2027* (2013.01); *G06K 9/00885* (2013.01); *G06K 9/209* (2013.01);
(Continued)

(58) Field of Classification Search
CPC .. G06K 9/2027; G06K 9/00885; G06K 9/209; G06K 9/40; G06K 2009/00932;
(Continued)

(56) References Cited

U.S. PATENT DOCUMENTS

| | | | | |
|---|---|---|---|---|
| 6,710,700 | B1 * | 3/2004 | Tatsukawa | .............. B60R 25/04 340/5.52 |
| 2003/0090154 | A1 * | 5/2003 | Takezaki | ................. B60R 25/04 307/10.2 |

(Continued)

FOREIGN PATENT DOCUMENTS

| | | |
|---|---|---|
| CN | 1796712 A | 7/2006 |
| CN | 101974991 B | 11/2014 |
| TW | M293188 U | 7/2006 |

*Primary Examiner* — Tanmay Shah
(74) *Attorney, Agent, or Firm* — Steven Reiss

(57) ABSTRACT

An intelligent entrance guard unlocking method includes: transmitting electric energy by wireless electromagnetic radiation via a transmit coil; receiving the electric energy via a receive coil; capturing a vein image of a part of a user via a number of small cameras by Infrared scanning technology and filtering noises from the vein image to get a filtered vein image; transmitting a wireless signal containing the filtered vein image to an intelligent entrance guard; comparing the filtered vein image with a predefined vein image; unlocking the intelligent entrance guard when the filtered vein image matches with the predefined vein image and not unlocking the intelligent entrance guard when the filtered vein image does not match with the predefined vein image.

16 Claims, 3 Drawing Sheets

(51) Int. Cl.
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)
*G06K 9/20* (2006.01)
*G06K 9/40* (2006.01)
*G07C 9/00* (2006.01)

(52) U.S. Cl.
CPC ............ *G06K 9/40* (2013.01); *G07C 9/00563* (2013.01); *G06K 2009/00932* (2013.01); *G07C 2009/00095* (2013.01); *G07C 2009/00603* (2013.01)

(58) Field of Classification Search
CPC ...... G07C 9/00563; G07C 2009/00603; G07C 2009/00095
USPC ........................................................ 340/5.53
See application file for complete search history.

(56) References Cited

U.S. PATENT DOCUMENTS

2005/0030155 A1* 2/2005 Johnson ............. G07C 9/00182
340/5.61
2015/0233146 A1* 8/2015 Klevens .................. E05B 41/00
340/687

* cited by examiner

INTELLIGENT ENTRANCE GUARD UNLOCKING SYSTEM AND UNLOCKING METHOD THEREOF

CROSS-REFERENCE TO RELATED APPLICATIONS

The application is related to co-pending applications Ser. Nos. 14/755,846, 14/755,824, 14/755,887, 14/755,911, all entitled, "INTELLIGENT ENTRANCE GUARD UNLOCKING SYSTEM AND UNLOCKING METHOD THEREOF", by WEN-KUEI CHOU, HSIN-NAN CHEN, CHIA-WEI CHANG, KUANG-YAO LIAO and CHIH-CHUNG WENG. Such applications have the same assignee as the instant application and are concurrently filed herewith. The disclosure of the above-identified applications is incorporated herein by reference.

FIELD

The subject matter herein generally relates to intelligent entrance guard unlocking systems and intelligent entrance guard unlocking methods.

BACKGROUND

In order to control entrance to a room or a device, a security system or admittance system can be implemented. Traditional systems have included a physical key. A physical key requires the operator to maintain possession of the physical key for both entrance and preventing others from entrance. Other systems involve electronic devices that communicate via wired or wireless technology. These systems can include batteries to operate.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
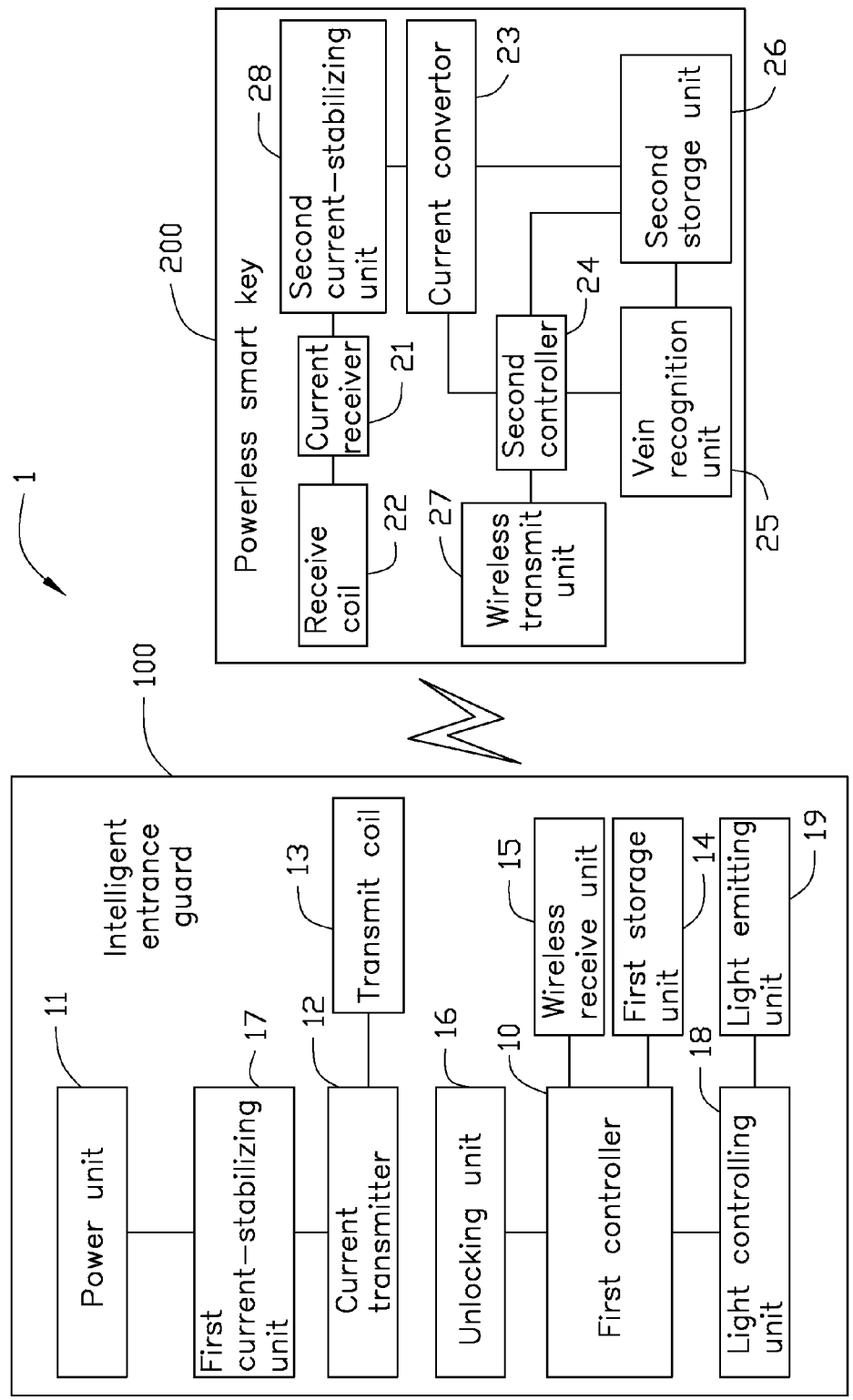
FIG. 1 is a block diagram of an embodiment of an intelligent entrance guard unlocking system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 shows an intelligent entrance guard unlocking system 1. The intelligent entrance guard unlocking system 1 can be run on but not limited to an intelligent entrance guard 100 and a powerless smart key 200.

The intelligent entrance guard 100 can include a first controller 10, a power unit 11, a current transmitter 12, a transmit coil 13, a first storage unit 14 and a wireless receive unit 15 and an unlocking unit 16. The power unit 11 can be a battery.

The first storage unit 14 can be used to store a predefined identification code and a predefined vein image. In at least one embodiment, the predefined identification code can be an identification code of a smart key matched with the intelligent entrance guard 100, and the vein image can be a vein image of a valid user of the intelligent entrance guard 100.

The powerless smart key 200 can include a current receiver 21, a receive coil 22, a current convertor 23, a second controller 24, a vein recognition unit 25, a second storage unit 26 and a wireless transmit module 27.

The vein recognition unit 25 can be used to capture a vein image of a part of a user via a number of small cameras by Infrared scanning technology, such as a vein image of an index fingertip of the user, a vein image of a middle fingertip of the user, or a thumb fingertip of the user, or other suitable part of the user, such as an arm of the user, or the like. The vein recognition unit 25 can further filter noises from the vein image to get a filtered vein image.

The second storage unit 26 can be used to store the filtered vein image recognized by the vein recognition unit 25 and a unique identification code of the powerless smart key 200.

The current transmitter 12 of the intelligent entrance guard 100 can transmit electric energy of the power unit 11 by wireless electromagnetic radiation via the transmit coil 13. The current receiver 21 can receive the electric energy if it is within a predefined distance of the transmit coil 13 via the receive coil 22 and power the powerless smart key 200 via the received electric energy.

The powerless smart key 200 is started to work when being powered. That is, the vein recognition unit 25 can capture the vein image of the part of the user via the number of small cameras by Infrared scanning technology. The vein recognition unit 25 can filter the noise from the vein image to get the filtered vein image. The vein recognition unit 25 can further store the filtered vein image in the second storage unit 26. The second controller 24 can obtain the unique identification code and the vein filtered image from the second storage unit 26. The second controller 24 can further control the wireless transmit unit 27 to transmit a wireless signal containing the unique identification code and the filtered vein image. The wireless receive unit 15 of the intelligent entrance guard 100 can receive the wireless signal.

The intelligent entrance guard 100 can further obtain the unique identification code and the filtered vein image from the wireless signal. The intelligent entrance guard 100 can further compare the predefined identification code obtained from the first storage unit 14 of the intelligent entrance guard 100 with the unique identification code. The intelligent entrance guard 100 can further compare the predefined vein image from the first storage unit 14 of the intelligent entrance guard 100 with the filtered vein image. If the unique identification code matches with the predefined identification code and the filtered vein image matches with the predefined vein image, the unlocking unit 16 can control to unlock the intelligent entrance guard 100. The details are as follows.

The current transmitter 12 can electrically couple the power unit 11 with the transmit coil 13. In the embodiment, the current transmitter 12 can be a current transmission circuit, and used to optimize the electric energy received from the power unit 11. In detail, the current transmitter 12 can receive electric energy supplied by the power unit 11, and filter noises of the received electric energy, and further transmit the electric energy by wireless electromagnetic radiation via the transmit coil 13. In this embodiment, the electric energy can be alternating current.

The current receiver 21 can electrically couple with the receive coil 22. The current receiver 21 can be used to receive the electric energy from the transmit coil 13 via the receive coil 22. In the embodiment, the current receiver 21 can be a current receiving circuit, and the current receiver 21 can be used to filter noises of the electric energy received from the receive coil 22. The electric energy can be alternating current. The receive coil 22 can be coupled with the transmit coil 13. The transmit coil 13 can make the receive coil 22 generate induced current in a form of electromagnetic induction, and the induced current can be alternating current.

The current convertor 23 can be used to convert the alternating current into direct current and power the powerless smart key 200 via the current, as if the powerless smart key 200 can be powered by a battery of itself.

The vein recognition unit 25 can capture the vein image of the part of the user via the number of small cameras by Infrared scanning technology, and filter the noise from the vein image to get the filtered vein image and further store the filtered vein image in the second storage unit 26.

The second controller 24 can electrically couple the second storage unit 26 with the wireless transmit unit 27. The second controller 24 can be used to obtain the unique identification code and the filtered vein image from the second storage unit 26 after the powerless smart key 200 has been powered. The second controller 24 can further control the wireless transmit unit 27 to transmit the wireless signal containing the unique identification code and the filtered vein image.

The first controller 10 can electrically couple with the wireless receive unit 15 and the first storage unit 14 respectively. The first controller 10 can be used to receive the wireless signal via the wireless receive unit 15. The first controller 10 can obtain the unique identification code and the filtered vein image from the wireless signal. The first controller 10 can compare the predefined identification code obtained from the first storage unit 14 with the unique identification code, and further compare the predefined vein image obtained from the first storage unit 14 with the filtered vein image.

The unlocking unit 16 can control to unlock the intelligent entrance guard 100 when the unique identification code is matched with the predefined identification code and the filtered vein image is matched with the predefined vein image. The unlocking unit 16 cannot control to unlock the intelligent entrance guard 100 when the unique identification code is not matched with the predefined identification code and/or the filtered vein image is not matched with the predefined vein image.

In at least one embodiment, the intelligent entrance guard 100 can further include a first current-stabilizing unit 17. The first current-stabilizing unit 17 can electrically couple the power unit 11 with the current transmitter 12. The first current-stabilizing unit 17 can be used to stabilize the current of the power unit 11 to prevent the current to exceed a predefined value suddenly, which may damage the electronic components of the intelligent entrance guard 100.

In at least one embodiment, the intelligent entrance guard 100 can further include a light controlling unit 18 and a light emitting unit 19. The light controlling unit 18 can electrically couple the first controller 10 with the light emitting unit 19. The light controlling unit 18 can be used to control the light emitting unit 19 to emit light with one color to prompt the user that the verification is successful when the unique identification code is matched with the predefined identification code and the filtered vein image is matched with the predefined vein image. The light controlling unit 18 can further control the light emitting unit 19 to emit light with another color to prompt the user that the verification is unsuccessful when the unique identification code is not matched with the predefined identification code and/or the filtered vein image is not matched with the predefined vein image.

In at least one embodiment, the powerless smart key 200 can further include a second current-stabilizing unit 28. The second current-stabilizing unit 28 can couple the current receiver 21 with the current convertor 23. The second current-stabilizing unit 28 can be used to stabilize the current of the received alternating current to prevent the current to exceed a predefined value suddenly, which may damage the electronic components of the powerless smart key 200.

In at least one embodiment, if the received electric energy is direct current, the current convertor 23 can be thus omitted.

In at least one embodiment, the unique identification code matched with the predefined identification code can be that the unique identification code is equal with the predefined identification code and/or the unique identification code is uniquely corresponding to the predefined identification code.

In at least one embodiment, the vein image matched with the predefined vein image can be that the filtered vein image is same to the predefined vein image and/or the filtered vein image is uniquely corresponding to the predefined vein image.

In at least one embodiment, the intelligent entrance guard unlocking system 1 can be used but not limited to a vehicle door, a door, a box, a cabinet, an electronic device or other suitable device or object, for safety.

The above verification process can include the verification of the identification code and the verification of the filtered vein image. In at least one embodiment, and the verification of the identification code can be omitted. Therefore, the second controller 24 can control the wireless transmit unit 27 to transmit the wireless signal containing the filtered vein image. The first controller 10 can compare the predefined vein image obtained from the first storage unit 14 with the filtered vein image. The unlocking unit 16 can control to unlock the intelligent entrance guard 100 when the filtered vein image is matched with the predefined vein image. The unlocking unit 16 cannot control to unlock the intelligent entrance guard 100 when the filtered vein image is not matched with the predefined vein image. The light controlling unit 18 can control the light emitting unit 19 to emit light with one color to prompt the user that the verification is successful when the filtered vein image is matched with the predefined vein image. The light controlling unit 18 can further control the light emitting unit 19 to emit light with another color to prompt the user that the verification is unsuccessful when the filtered vein image is not matched with the predefined vein image.

Figure 2:
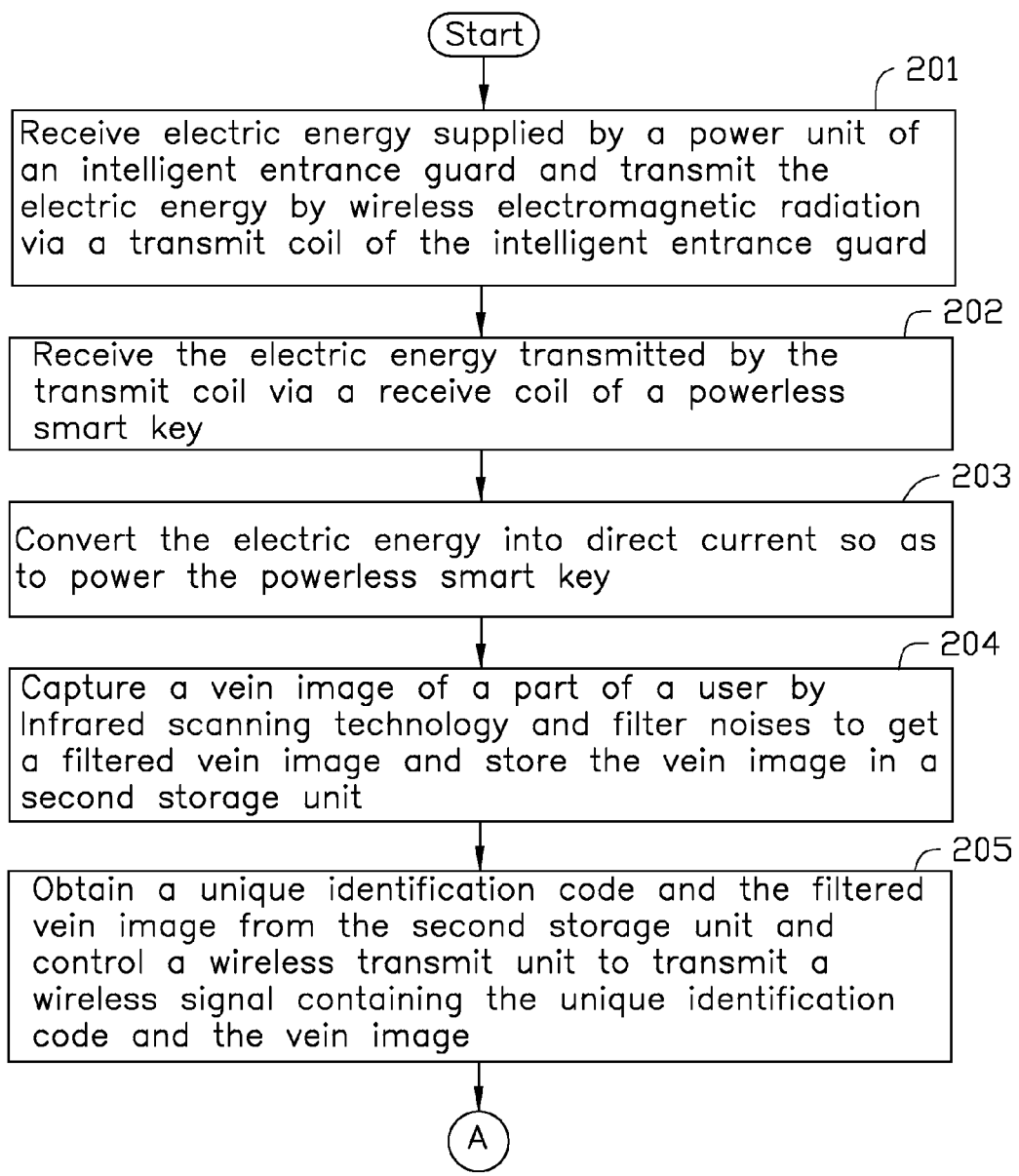
FIGS. 2 and 3 cooperatively constitute a signal flowchart of an embodiment of an intelligent entrance guard unlocking method.
Figure 3:
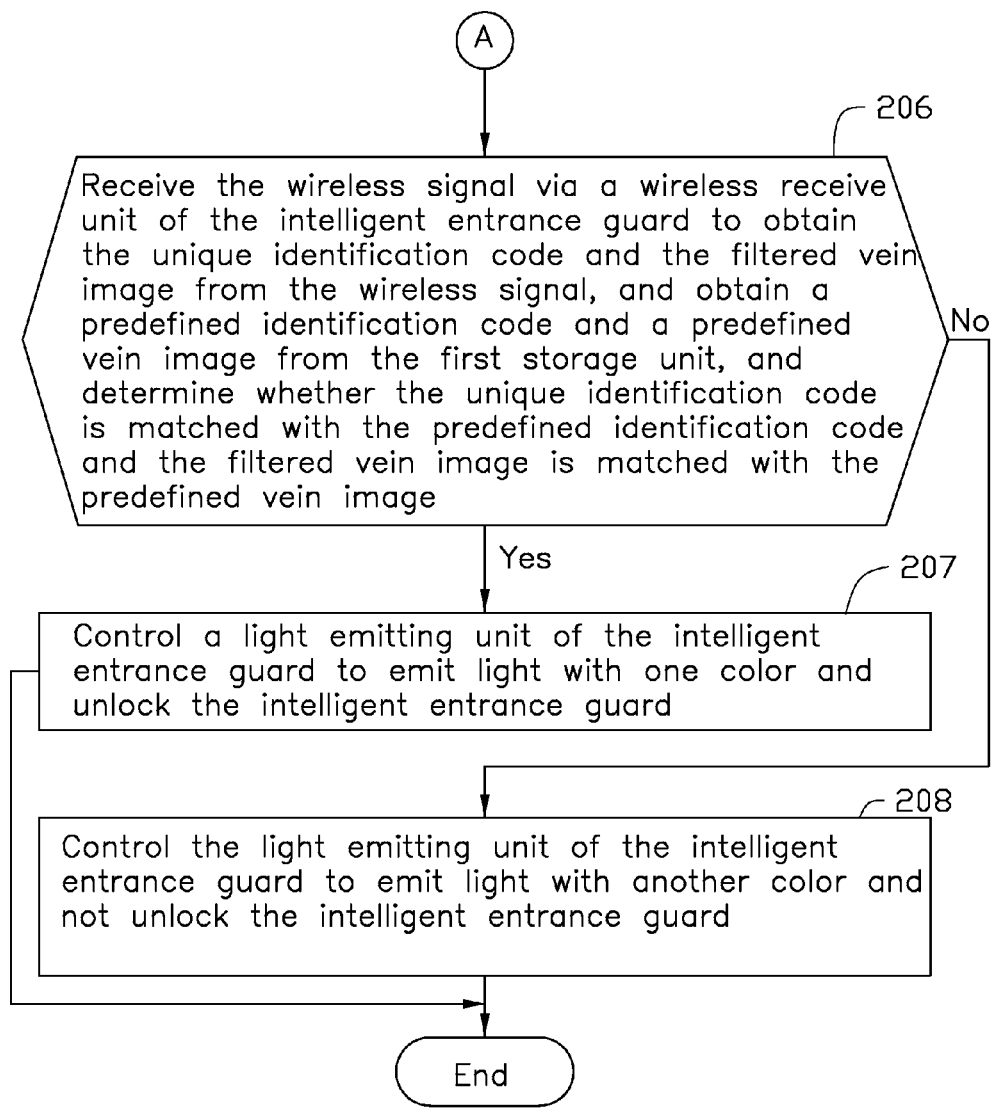

FIGS. 2 and 3 illustrates a flowchart of an intelligent entrance guard unlocking method. The intelligent entrance guard unlocking method is provided by way of example, as there are a variety of ways to carry out the method. The control method described below can be carried out using the configurations illustrated in FIG. 1, for example, and various elements of these figures are referenced in explaining the example method. Each block shown in FIGS. 2 and 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, a current transmitter receives electric energy supplied by a power unit of an intelligent entrance guard, and transmits the electric energy by wireless electromagnetic radiation via a transmit coil of the intelligent entrance guard, and the electric energy is alternating current.

At block 202, a current receiver receives the electric energy transmitted by the transmit coil via a receive coil of a powerless smart key, and the electric energy is alternating current.

At block 203, a current convertor converts the alternating current into direct current and power the powerless smart key via the received electric energy as if the powerless smart key is powered by a battery of itself.

At block 204, a vein recognition unit captures a vein image of a part of a user via a number of small cameras by Infrared scanning technology and filters noises from the vein image to get a filtered vein image and further stores the filtered vein image in a second storage unit of the powerless smart key.

At block 205, a second controller obtains a unique identification code and the filtered vein image from the second storage unit of the powerless smart key after the powerless smart key has been powered, and further controls a wireless transmit unit to transmit a wireless signal containing the unique identification code and the filtered vein image.

At block 206, a first controller receives the wireless signal via a wireless receive unit of the intelligent entrance guard, and obtains the unique identification code and the filtered vein image from the wireless signal, and compares a predefined identification code obtained from a first storage unit of the intelligent entrance guard with the unique identification code, and compares a predefined vein image obtained from the first storage unit of the intelligent entrance guard with the filtered vein image, and determines whether the unique identification code is matched with the predefined identification code and the filtered vein image is matched with the predefined vein image, if yes, the process goes to block 207, otherwise, the process goes to block 208.

At block 207, a light controlling unit controls a light emitting unit of the intelligent entrance guard to emit light with one color to prompt the user that the verification is successful and a unlocking unit controls to unlock the intelligent entrance guard.

At block 208, the light controlling unit controls the light emitting unit of the intelligent entrance guard to emit light with another color to prompt the user that the verification is unsuccessful and the unlocking unit cannot control to unlock the intelligent entrance guard.

The embodiments shown and described above are only examples. Many details are often found in the art such as the other features of intelligent entrance guard unlocking system and unlocking method thereof. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An intelligent entrance guard unlocking system comprising:
a power unit of an intelligent entrance guard;
a current transmitter of the intelligent entrance guard electrically coupling the power unit with a transmitter coil, and the current transmitter being configured to receive electric energy supplied by the power unit, wherein the current transmitter transmits the electric energy by wireless electromagnetic radiation through the transmit coil;
a first storage unit of the intelligent entrance guard storing a predefined vein image;
a first controller of the intelligent entrance guard coupled to the first storage unit;
a wireless receiver unit of the intelligent entrance guard coupled to the first controller;
an unlocking unit of the intelligent entrance guard coupled to the first controller; and
a powerless smart key comprising:
a receiver coil;
a current receiver electrically coupled to the receiver coil, and configured to receive the electric energy via the receiver coil such that the powerless smart key is powered;
a vein recognition unit coupled to a second storage unit, and configured to capture a vein image of a part of a user via a number of small cameras by Infrared scanning technology and filter noises from the vein image to get a filtered vein image and further store the filtered vein image in the second storage unit; and
a second controller coupled to a wireless transmit unit with the second storage unit and configured to control the wireless transmit unit to transmit a wireless signal containing the filtered vein image;
wherein, the wireless receive unit receives the wireless signal, and the first controller is configured to obtain the predefined vein image from the first storage unit and compare the filtered vein image with the predefined vein image, and the unlocking unit is configured to unlock the intelligent entrance guard when the filtered vein image matches with the predefined vein image, and not unlock the intelligent entrance guard when the filtered vein image does not match with the predefined vein image, the first storage unit further stores a predefined identification code, the wireless signal further contains an identification code, and wherein the first controller is further configured to obtain the predefined identification code from the first storage unit, and to compare the identification code with the predefined identification code; the unlocking unit is configured to unlock the intelligent entrance guard when the filtered vein image matches with the predefined vein image and the identification code matches with the predefined identification code.

2. The intelligent entrance guard unlocking system of claim 1, wherein the intelligent entrance guard unlocking system further comprises a light controlling unit of the intelligent entrance guard, the light controlling unit electrically couples the first controller with a light emitting unit, the light controlling unit is configured to control the light emitting unit to emit light with one color when the filtered vein image matches with the predefined vein image and further control the light emitting unit to emit light with another color when the filtered vein image does not match with the predefined vein image.

3. The intelligent entrance guard unlocking system of claim 1, wherein the unlocking unit is configured to not unlock the intelligent entrance guard when the filtered vein image does not match with the predefined vein image or the identification code does not match with the predefined identification code.

4. The intelligent entrance guard unlocking system of claim 3, wherein the intelligent entrance guard unlocking system further comprises a light controlling unit, the light controlling unit electrically couples the first controller with the light emitting unit, the light controlling unit is configured to control the light emitting unit to emit light with one color when the filtered vein image matches with the predefined vein image and the identification code matches with the predefined identification code, and the light controlling unit is further configured to control the light emitting unit to emit light with another color when the filtered vein image does not match with the predefined vein image or the identification code does not match with the predefined identification code.

5. The intelligent entrance guard unlocking system of claim 1, wherein the intelligent entrance guard unlocking system further comprises a first current-stabilizing unit electrically coupled the power unit with the current transmitter, and the first current-stabilizing unit is configured to stabilize current of the power unit to prevent the current to exceed a predefined value suddenly.

6. The intelligent entrance guard unlocking system of claim 1, wherein the powerless smart key further comprises a second current-stabilizing unit electrically coupled the current receiver with the current convertor, and the second current-stabilizing unit is configured to stabilize current of the received electric energy to prevent the current to exceed a predefined value suddenly.

7. The intelligent entrance guard unlocking system of claim 1, wherein the powerless smart key further comprises a current convertor electrically coupled the current receiver with the second controller, and the current convertor is configured to convert alternating current of electric energy into direct current so as to power the powerless smart key.

8. An intelligent entrance guard unlocking method comprising:
   transmitting electric energy of a power unit of an intelligent entrance guard by wireless electromagnetic radiation via a transmit coil;
   receiving the electric energy via a receive coil of a powerless smart key such that the powerless smart key is powered;
   capturing a vein image of a part of a user via a number of small cameras by Infrared scanning technology and filtering noises from the vein image to get a filtered vein image and further storing the filtered vein image in a second storage unit of the powerless smart key;
   controlling a wireless transmit unit of the powerless smart key to transmit a wireless signal containing the filtered vein image to the intelligent entrance guard;
   obtaining a predefined vein image from a first storage unit of the intelligent entrance guard and comparing the filtered vein image with the predefined vein image;
   unlocking the intelligent entrance guard when the filtered vein image matches with the predefined vein image;
   not unlocking the intelligent entrance guard when the filtered vein image does not match with the predefined vein image: and
   stabilizing current of the power unit to prevent the current to exceed a predefined value suddenly.

9. The intelligent entrance guard unlocking method of claim 8, the intelligent entrance guard unlocking method further comprising:
   controlling a light emitting unit of the intelligent entrance guard to emit light with one color when the filtered vein image matches with the predefined vein image; and
   controlling the light emitting unit to emit light with another color when the filtered vein image does not match with the predefined vein image.

10. The intelligent entrance guard unlocking method of claim 8, wherein the wireless signal further contains the identification code, the intelligent entrance guard unlocking method further comprises:
    obtaining a predefined identification code from the first storage unit;
    comparing the identification code with the predefined identification code;
    unlocking the intelligent entrance guard when the filtered vein image matches with the predefined vein image and the identification code matches with the predefined identification code; and
    not unlocking the intelligent entrance guard when the filtered vein image does not match with the predefined vein image or the identification code does not match with the predefined identification code.

11. The intelligent entrance guard unlocking method of claim 10, the intelligent entrance guard unlocking method further comprising:
    controlling a light emitting unit of the intelligent entrance guard to emit light with one color when the filtered vein image matches with the predefined vein image and the identification code matches with the predefined identification code; and
    controlling the light emitting unit to emit light with another color when the filtered vein image does not match with the predefined vein image or the identification code does not match with the predefined identification code.

12. The intelligent entrance guard unlocking method of claim 8, the intelligent entrance guard unlocking method further comprising:
    stabilizing current of the received electric energy to prevent the current to exceed a predefined value suddenly.

13. The intelligent entrance guard unlocking method of claim 8, the intelligent entrance guard unlocking method further comprising:

converting alternating current of the electric energy into direct current so as to power the powerless smart key.

14. A powerless smart key comprising:

a receive coil;

a current receiver electrically coupled to the receive coil, and configured to receive electric energy via the receive coil such that the powerless smart key is powered;

a vein recognition unit coupled to a storage unit and configured to capture a vein image of a part of a user via a number of small cameras by Infrared scanning technology and filter noises from the vein image to get a filtered vein image and further store the filtered vein image in the storage unit;

a controller coupled a wireless transmit unit with the storage unit, and configured to control the wireless transmit unit to transmit a wireless signal containing the filtered vein image to an intelligent entrance guard; and a current-stabilizing unit electrically coupled the current receiver with the current convertor, the current-stabilizing unit being configured to stabilize current of the received electric energy to prevent the current to exceed a predefined value suddenly, wherein, the intelligent entrance guard is capable of receiving the wireless signal and determining whether the powerless smart key is matched with the intelligent entrance guard according to the filtered vein image.

15. The powerless smart key of claim 14, wherein the storage unit further stores an identification code of the powerless smart key, the wireless signal further contains the identification code, and the intelligent entrance guard is capable of receiving the wireless signal and determining whether the powerless smart key is matched with the intelligent entrance guard according to the filtered vein image and the identification code.

16. The powerless smart key of claim 14, wherein the powerless smart key further comprises a current convertor electrically coupled the current receiver with the controller, and the current convertor is configured to convert alternating current of electric energy into direct current so as to power the powerless smart key.

* * * * *